March 2, 1943.   A. J. PENICK ET AL   2,312,476
WELL HEAD
Filed May 26, 1939
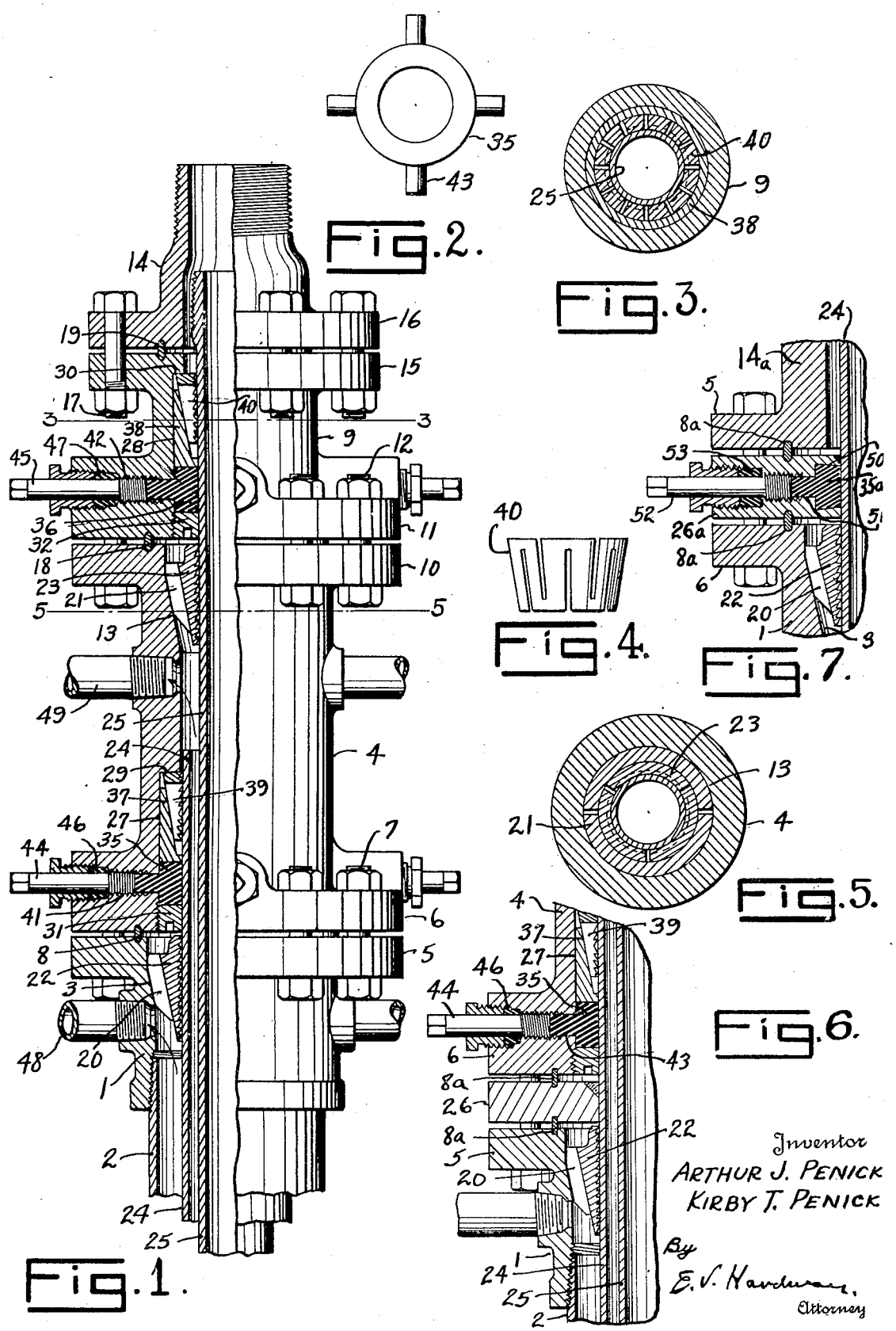
Inventor
ARTHUR J. PENICK
KIRBY T. PENICK
By E. V. Hardman
Attorney Patented Mar. 2, 1943

2,312,476

UNITED STATES PATENT OFFICE 2,312,476

WELL HEAD

Arthur J. Penick and Kirby T. Penick, Houston, Tex.

Application May 26, 1939, Serial No. 275,924

7 Claims. (Cl. 166—14)

This invention relates to a well head and has particular relation to novel sealing means between the head and an inner pipe, or inner pipes, through the head.

The invention also embodies novel means for supporting one, or more, pipes from the head against upward or downward movement, said pipe supporting means embodying also a novel type of stuffing box, or sealing means, whereby a fluid tight seal may be maintained between the head and the pipe therein, said stuffing box containing a reserve supply of packing material which may be utilized to take up wear on the sealing means whereby to maintain at all times a fluid tight seal.

The invention embodies certain improvements over the construction shown in our United States Patent No. 2,141,404, issued December 27, 1938.

With the above and other objects in view the invention has particular relation to certain novel features of construction, arrangement of parts and use, examples of which are given in this specification and illustrated in the accompanying drawing, wherein:

Figure 1 shows a side elevation of the head, partly in section.

Figure 2 shows a plan view of a seal ring employed.

Figure 3 shows a cross-sectional view taken on the line 3—3 of Figure 1.

Figure 4 shows an elevational view of a slip member.

Figure 5 shows a cross-sectional view taken on the line 5—5 of Figure 1.

Figure 6 shows a fragmentary, vertical, sectional view illustrating another embodiment, and Figure 7 shows a fragmentary, vertical, sectional view illustrating still another embodiment.

Referring now more particularly to the drawing wherein like numerals of reference designate the same parts in each of the figures, the numeral 1 designates a tubular braden head shown connected to the top of the well casing 2. This head has an inside, downwardly converging seat 3. Mounted on the head 1 there is the tubular head member 4, the adjacent ends of the head 1 and the head member 4 having external, annular flanges 5, 6 which may be secured together in any preferred manner as by bolts 7 and whose facing sides have registering grooves to receive the annular gasket 8.

On the head member there is a tubular tubing head 9, the adjacent ends of the head member 4 and the head 9 having coinciding, external flanges 10, 11 secured together in any preferred manner as by means of bolts 12. The upper end of the head member has the inside, downwardly converging seat 13.

On the tubing head there is a tubular adapter 14, for the connection of a Christmas tree thereto. The adjacent ends of the tubing head and adapter having the external, coinciding flanges 15, 16 secured together in any preferred manner as by bolts 17. The facing sides of the flanges 10, 11 have coinciding grooves to receive the gasket 18 and the facing sides of the flanges 15, 16 have registering grooves to receive the gasket 19. The parts 1, 4, 9 and 14, however, may be detachably secured together in any preferred manner so as to form fluid tight seals between them.

On the seats 3 and 13, respectively, are the split adapter rings 20, 21 whose outer and inner sides converge downwardly and within these adapter rings are a plurality of downwardly tapering wedge-shaped slips as 22, 23 whose inner sides are toothed to engage and support the outer and inner pipes 24, 25, respectively, to hold said pipes suspended in the well as illustrated in Figure 1. It will be noted that the inner pipe 25 extends upwardly above the upper end of said outer pipe and, as is obvious, the series of slips 22 have a greater inside diameter than that of the series of slips 23 so as to adapt said slips to the respective larger and smaller outside diameters of the pipes 24, 25. In the embodiment illustrated in Figure 6 there is shown, between the flanges 5, 6 a ring 26 around and welded to the outer pipe 24, with the annular, upper and lower gaskets 8a, 8a seated in coinciding grooves in the confronting faces of the flanges 5, 6 and the ring 26.

The lower ends of the head member 4 and the tubing head 9 are provided with the internal counterbores 27, 28 terminating, at their upper ends at the inside, annular, downwardly facing shoulders 29, 30.

Screwed into the lower ends of said counterbores are the glands 31, 32 which confine the inside sealing rings as 35, 36 beneath and seated on said sealing rings and located within said respective bores are the removable slip seats 37, 38 whose inner sides diverge upwardly. On these respective slip seats are the pipe engaging slips 39, 40 whose inner sides have both upwardly and downwardly pitched pipe engaging teeth as shown in Figure 1. Each slip 39, 40 is formed of one piece alternately slitted from opposite ends as shown in Figure 4 so as to be readily expansible and contractile. The upper ends of these respective slips engage the opposing shoulders 29, 30 to hold the slips against upward movement and to thereby also anchor the respective pipes engaged by them against upward movement. The seal rings 35, 36 are therefore confined between the respective glands 31, 32 on one side and the lower ends of the slip seats 37, 38 on the other side. The respective seal rings 35, 36 closely surround the corresponding outer and inner pipes 24, 25.

The head member 4 and the tubing head 9 have the radial bores 41, 42. The material of the sealing rings 35, 36 is preferably rubber or similar resilient material and extends out a distance into said respective bores, forming the radial reserve supplies 43 in the bores. Threaded into said bores are the radial plungers 44, 45 whose inner ends work against said reserve supplies of sealing material and whose outer ends extend outwardly beyond the head to receive an operating wrench. Said outer ends are surrounded by suitable stuffing boxes 46, 47 which form fluid tight seals therearound. In case a leak should develop past the seal 35 or 36, the corresponding plungers may be screwed inwardly to force additional material into the corresponding ring 35 or 36 so as to stop the leakage. As additional material is forced to flow into the seal rings by the pressure of the corresponding plungers the corresponding slip seats 37, 38 will be forced upwardly causing the corresponding slips 39, 40 to contract and more closely engage about the corresponding pipe. The inner pipe, or pipes, will thus be securely anchored and suspended in the well against downward or upward movement and fluid tight seals may be maintained between them and the head.

Beneath the corresponding seals the head is provided with suitable lower and upper outflow lines 48, 49 for permitting outflow of well fluid from the casing and the outer pipe 24, respectively.

In the form illustrated in Figure 7 there is shown between the flanges 5 and 6 an intermediate ring, or flange 26a around and welded to the outer pipe 24. In this form the inside pipe is supported by the slips 22 supported on the adapter 20 which rests on the seat 3 as shown in Figure 1 and the joints between the upper and lower flanges 5, 6 and the flange, or ring, 26a are sealed by upper and lower gaskets 8a. The flange 26a has an inside, annular groove 50 and a radial bore 51 leading outwardly from said groove. The groove 50 and bore, or bores, 51 are filled with sealing material 35a such as rubber. Threaded into each bore 51 there is a radial plunger 52 whose inner end operates against the surplus material in the bore 51. The plunger 52 extends outwardly beyond the flange 26a so that it may be readily turned and there is a stuffing box 53 in the flange 26a forming a seal about the corresponding plunger.

Should a leak develop between the pipe 24 and the sealing material 35a the plunger, or plungers, 52 may be screwed inwardly to cause the reserve supply of sealing material to flow into the sealing ring 35a to form a fluid tight joint.

What we claim is:

1. A tubular well head having an internal seal ring support, an annular seal ring on the support, a slip seat on the seal ring, a pipe engaging slip supported by the slip seat and engageable with an inside pipe, said head having a radial bore into which the material of the seal ring extends and means accessible from the outside of the head to apply inward pressure to the material in the bore to cause the same to flow into the material of the seal ring.

2. A tubular well head having an internal, seal ring support, an annular seal ring on the support, a slip seat on the seal ring, a pipe engaging slip supported by the slip seat and engageable with an inside pipe, said head having a radial bore into which the material of the seal ring extends, means accessible from the outside of the head to apply inward pressure to the material in the bore to cause the same to flow into the material of the seal ring, and sealing means in the head forming a fluid tight seal about said pressure-applying means.

3. A tubular well head having an inside seat, pipe engaging slips supported on said seat, a seal ring support in the head above the slips, a seal ring on the support, a slip seat on the seal ring, pipe engaging slips on the slip seat, means in the head to limit the range of upward movement of the last mentioned slips, said head having radial bores into which the material of the seal ring extends, radial plungers in the bores having threaded connections with the head for applying inward pressure to the material in the bores to cause the same to flow into the material of the seal ring and seals in the head around the plungers.

4. A tubular well head having an external flange, an inside seal ring support in the head, a slip seat in the head spaced above said support, said support and slip seat forming an inside, annular groove between them, annular resilient material in said groove, said head having a radial bore leading outwardly through the flange from said groove into which the material of the seal ring extends, a plunger having a threaded connection with the head and operative against the material in the bore and effective to apply inward pressure to said material to cause the same to flow into the material of the seal ring, sealing means in the head around the plunger, a pipe engaging slip on the slip seat.

5. A tubular well head having an external flange, an inside seal ring support in the head, a slip seat in the head spaced above said support, said support and slip seat forming an inside, annular groove between them, annular resilient material in said groove, said head having a radial bore leading outwardly through the flange from said groove into which the material of the seal ring extends, a plunger having a threaded connection with the head and operative against the material in the bore and effective to apply inward pressure to said material to cause the same to flow into the material of the seal ring, sealing means in the head around the plunger, a pipe engaging slip on the slip seat and means in the head above the slip to limit the upward movement of the slip.

6. A tubular well head having upper and lower inside seats, pipe engaging slips on the seats adapted to engage inside pipes in the head, seal ring supports in the head above the respective slips, seal rings on the supports, slip seats on the respective seal rings, pipe engaging slips on the respective slip seats, means in the head to limit the range of upward movement of the last mentioned slips.

7. A tubular well head having upper and lower inside seats, pipe engaging slips on the seats adapted to engage inside pipes in the head, seal ring supports in the head above the respective slips, seal rings on the supports, slip seats on the respective seal rings, pipe engaging slips on the respective slips seats, means in the head to limit the range of upward movement of the last mentioned slips, said head having radial bores into which the material of the respective seal rings extend and means accessible from the outside of the head to apply inward pressure to the material in the bores to cause the same to flow into the material of the corresponding seal rings.

ARTHUR J. PENICK.
KIRBY T. PENICK.